(12) United States Patent
Sayyadi et al.

(10) Patent No.: US 8,094,124 B2
(45) Date of Patent: Jan. 10, 2012

(54) POINTING DEVICE WITH CUSTOMIZATION OPTIONS

(75) Inventors: Babak Sayyadi, Bellevue, WA (US);
Amandu Wu, Seattle, WA (US); Gil Manalo, Redmond, WA (US); Kevin Flick, Seattle, WA (US); Sarah J. Fuelling, Seattle, WA (US); Michael Becker, Seattle, WA (US); Santosh Shetty, Redmond, WA (US); David M. Lane, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 723 days.

(21) Appl. No.: 11/840,507

(22) Filed: Aug. 17, 2007

(65) Prior Publication Data

US 2009/0046062 A1  Feb. 19, 2009

(51) Int. Cl.
*G09G 5/08* (2006.01)
(52) U.S. Cl. .................. 345/163; 345/157; 345/166
(58) Field of Classification Search .......... 345/156–166; 248/188–188.4
See application file for complete search history.

(56) References Cited

U.S. PATENT DOCUMENTS

| 5,692,956 | A | | 12/1997 | Rifkin | 463/37 |
| 5,844,775 | A | * | 12/1998 | Lundberg | 361/679.08 |
| 6,151,806 | A | * | 11/2000 | Morris et al. | 36/136 |
| 6,429,851 | B1 | | 8/2002 | Vaghefi et al. | 345/163 |
| 6,828,958 | B2 | | 12/2004 | Davenport | 345/163 |
| 7,009,597 | B1 | * | 3/2006 | Ames | 345/163 |
| 2001/0038378 | A1 | | 11/2001 | Zwern | 345/156 |
| 2002/0005834 | A1 | * | 1/2002 | Oh | 345/163 |
| 2005/0248533 | A1 | * | 11/2005 | Chu | 345/163 |
| 2006/0148564 | A1 | * | 7/2006 | Herkelman | 463/37 |
| 2006/0202961 | A1 | * | 9/2006 | Chang | 345/163 |
| 2006/0250360 | A1 | | 11/2006 | Goodwin et al. | 345/163 |
| 2007/0002051 | A1 | * | 1/2007 | Navratil et al. | 345/440 |
| 2007/0069088 | A1 | * | 3/2007 | Bidiville et al. | 248/188.9 |
| 2007/0159461 | A1 | * | 7/2007 | Zhou | 345/163 |
| 2008/0055250 | A1 | * | 3/2008 | Chang | 345/163 |

FOREIGN PATENT DOCUMENTS

EP    1 768 346 A1    3/2007

OTHER PUBLICATIONS

D. Girard, "Logitech G5 Laser Mouse," Ars Technica, LLC, http://arstechnica.com/reviews/logitech-g5.ars, Nov. 2005, 1-10.

* cited by examiner

*Primary Examiner* — Amare Mengistu
*Assistant Examiner* — Hong Zhou
(74) *Attorney, Agent, or Firm* — Westman, Champlin & Kelly, P.A.

(57) ABSTRACT

A pointing device that can interface with a graphical user interface of a computer or other electronic device. The pointing device includes a body having an upper portion and an underside. Also included is a tracking assembly having at least one sensor to detect movement and output a control signal responsive to the detected movement. The pointing device further includes several customization features. The customization features include mechanical customization features and software customization features. At least some of the mechanical customization features are configured to be replaceable. Such replaceable customization features are releasably mechanically coupled to the pointing device body.

10 Claims, 7 Drawing Sheets

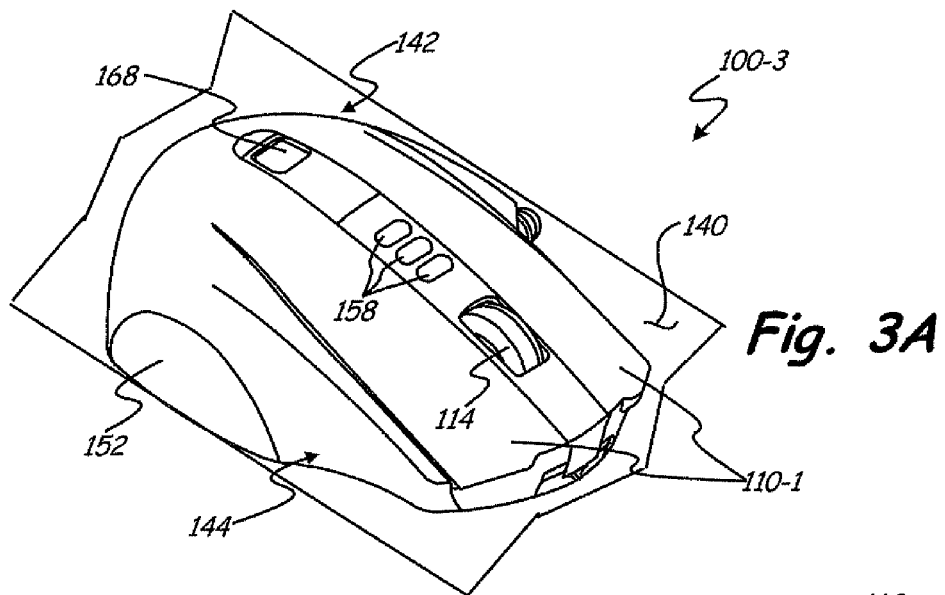
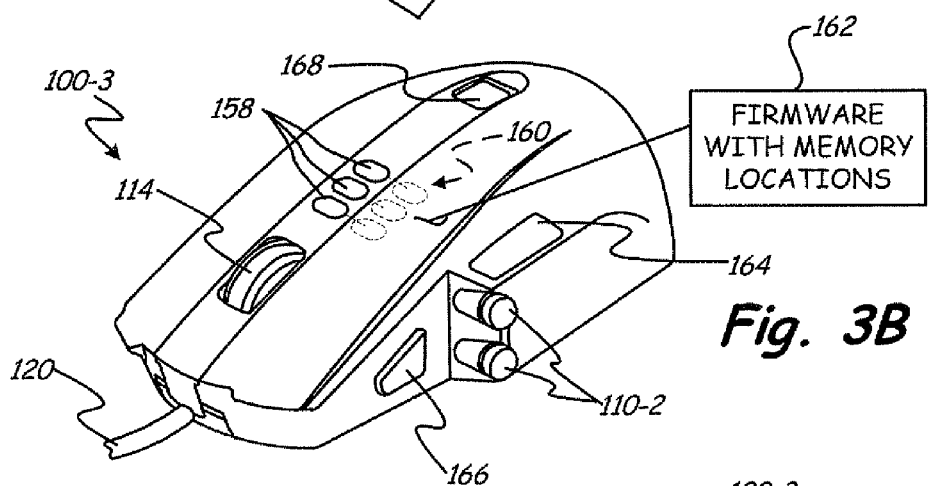
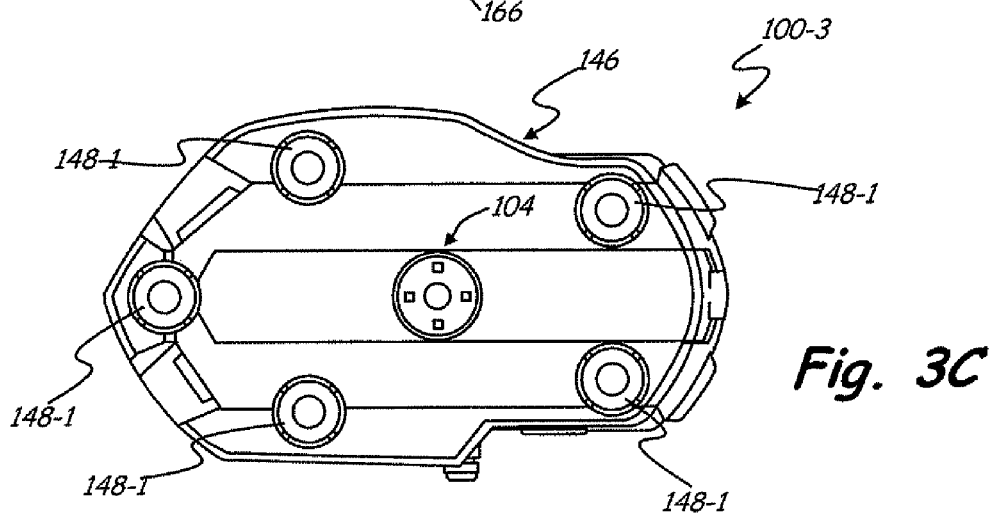

POINTING DEVICE WITH CUSTOMIZATION OPTIONS

BACKGROUND

Pointing devices (such as mice) are used to interface with a computer or electronic device, such as a personal computer or laptop computer. A primary use of a pointing device is to translate motion of a user's hand into signals that a computer, connected to the pointing device, can use. For certain computer applications, such as fast paced computer games, rapid movement and positioning of the pointing device is needed to substantially constantly target moving objects and views in the game environment. Hence, constant moving, stopping, clicking, changes of direction and selection of various in-game functions/weapons as fast and conveniently as possible is a key need for a pointing device.

The discussion above is merely provided for general background information and is not intended to be used as an aid in determining the scope of the claimed subject matter.

SUMMARY

Embodiments disclosed in the application relate to a pointing device and a pointing device kit. As disclosed the pointing device includes a body having an upper portion and an underside. Also included is a tracking assembly having at least one sensor to detect movement and output a control signal responsive to the detected movement. In embodiments disclosed, the pointing device includes several customization features. The customization features include mechanical customization features and software customization features. At least some of the mechanical customization features are configured to be replaceable. Such replaceable features are releasably mechanically coupled to the pointing device body. The pointing device can be shipped with one attached set of releasably coupled mechanical customization features and additional replacement sets for these features. In one embodiment, in addition to the pointing device, a cable anchor, which doubles as a housing for the replacement sets, is also included.

This Summary is provided to introduce a selection of concepts in a simplified form which are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 3A-3D show different views of an embodiment of a pointing device.

While the above-identified figures set forth one or more embodiments of the pointing device, other embodiments are also contemplated, as noted in the disclosure. In all cases, this disclosure presents the pointing device by way of representation and not limitation. It should be understood that numerous other modifications and embodiments can be devised by those skilled in the art which fall within the scope and spirit of the principles of this disclosure.

DETAILED DESCRIPTION

Figure 1:
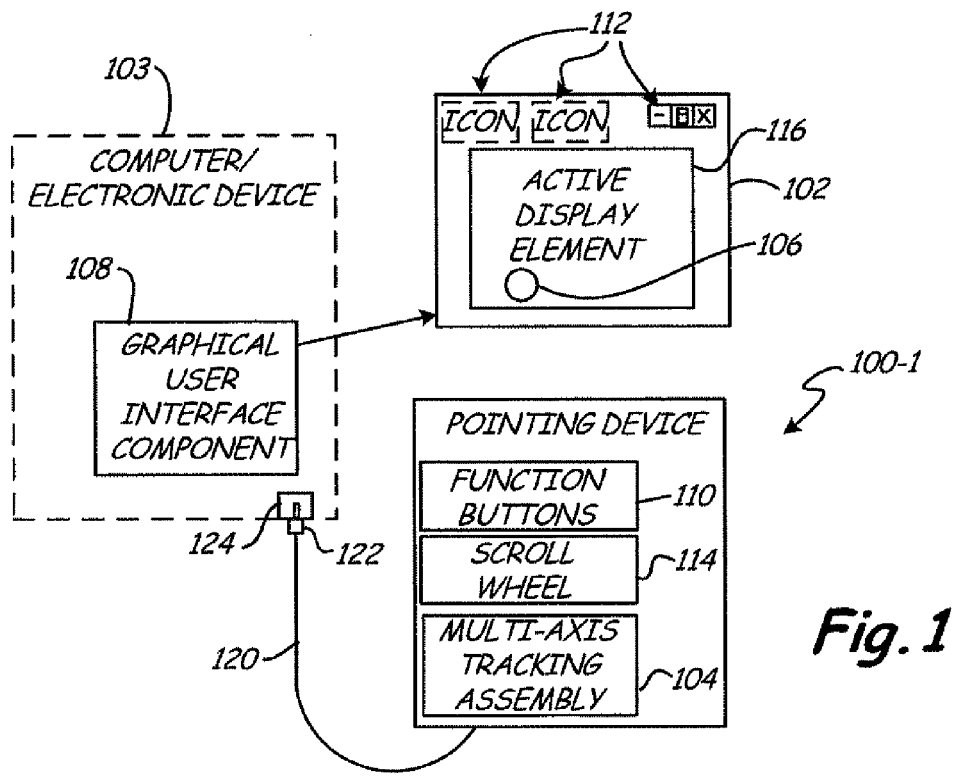
FIG. 1 is a schematic illustration of an embodiment of a pointing device and operating environment.

Pointing devices allow a user to interface with applications or programs on a computer device such as a personal computer, portable computer or other electronic device having a graphical user interface. FIG. 1 schematically illustrates an embodiment of a pointing device 100-1 that is configured to interface with a graphical user interface on a graphical display 102 of a computer or other electronic device 103. In the illustrated embodiment, the pointing device 100-1 includes a tracking assembly 104, which is configured to control a position of an object on the graphical display 102. Illustratively, the object is a pointer or cursor 106 as shown in FIG. 1. Alternatively, the object is a game object for an electronic game.

The tracking assembly 104 is configured detect movement and output a control signal proportional to the detected movement. The control signal is processed by a graphical user interface component 108 to position the cursor or pointer 106 on the graphical display 102 in response to input from the pointing device 100-1.

In the illustrated embodiment, the tracking assembly 104 includes one or more sensor elements (not shown in FIG. 1) to detect multi-axial movement of the pointing device relative to a reference position. Illustrative sensor elements include mechanical sensor elements such as roller balls, optical sensor elements such as light-emitting diodes or photodiodes, or laser sensor elements which use an infrared laser to detect movement of the device. Application of illustrated embodiments is not limited to the particular embodiment shown in FIG. 1, nor to the particular sensor elements described.

As shown in FIG. 1, in the illustrated embodiment, the pointing device 100-1 includes one or more function buttons 110 to select or activate various functions or features on the graphical display 102. The functions or features are selected through icons or input 112 of the graphical user interface. Functions are activated or selected by positioning the pointer or cursor 106 relative to the particular icon or input 112 corresponding to the desired function or feature.

Once the pointer or cursor 106 is positioned on the desired icon or input 112, the user depresses the button 110 to activate the function corresponding to the particular icon or input 112 selected. Upon activation of the one or more buttons 110, the device outputs a control signal, which is processed by the graphical user interface component 108 to activate or invoke the selected application function or feature.

The illustrated device also includes a scroll wheel 114. The scroll wheel 114 is rotatable about a single axis to provide a one-dimensional input, which is used to scroll through an active display element 116 of the graphical display 102. Illustrative display elements 116 include, but are not limited to, text documents, HTML documents or Web pages. Although FIG. 1 illustrates a particular configuration for a pointing device, the application is not limited to a pointing device including each of the buttons or components illustrated in FIG. 1.

In an illustrated embodiment, the pointing device communicates with the graphical user interface component 108 through a cable 120 connected to or hard wired to circuitry of the pointing device 100-1. The cable 120 is connected to the computer or electronic device 103 via a connector plug 122 (illustrated schematically) insertable into a connector port 124 on the computer device. Although a cable connection is illustrated in FIG. 1, the application is not limited to a pointing device coupled to the computer device 103 via a cable connection.

Figure 2:
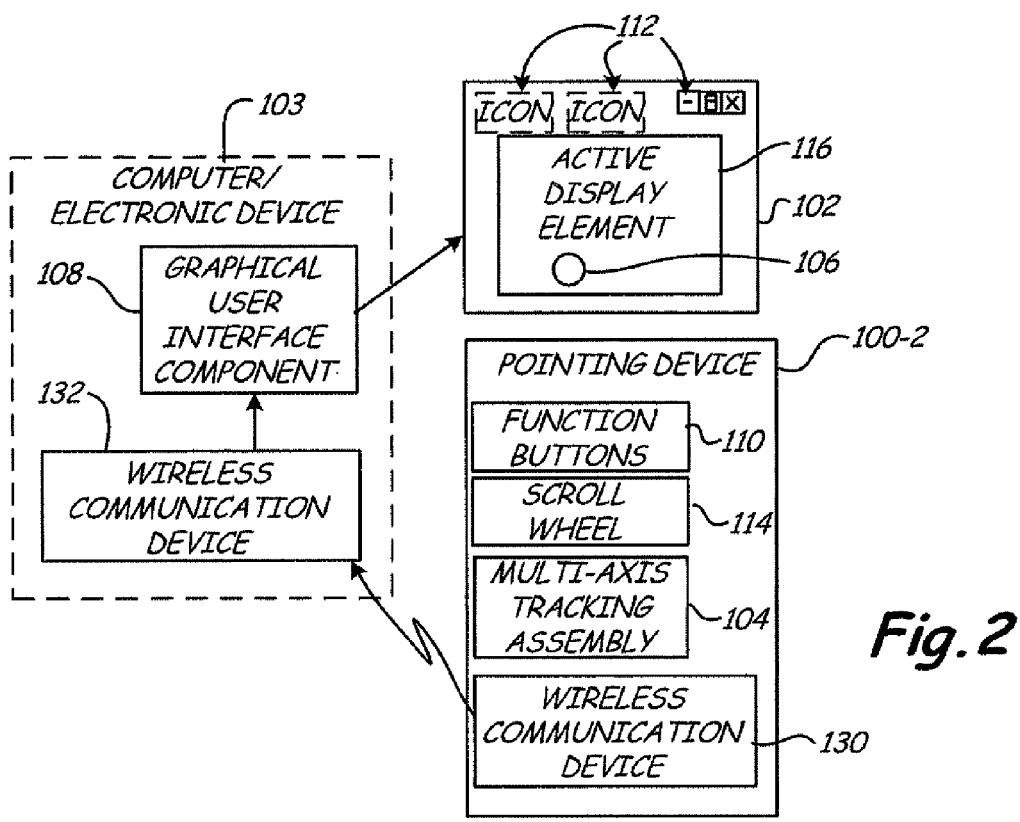
FIG. 2 is a schematic illustration of an embodiment of a wireless pointing device and operating environment.

For example, in an alternate embodiment shown in FIG. 2, the pointing device 100-2 communicates with the computer or electronic device 103 through a wireless interface. The wireless interface includes a wireless communication device 130 coupled or connected to the pointer device 100-2 and a wireless communication device 132 coupled to the computer device 103. Output from the pointing device 100-2 is transmitted via the wireless communication device 130 to the wireless communication device 132 on the computer device 103 via known communication protocols. Illustratively the wireless communication device can utilize an RF communication protocol or other communication protocols. The transmitted output is processed by the graphical user interface component 108 to provide a user interface through the graphical display 102.

It should be noted that, although both FIGS. 1 and 2 depict display 102 with maximize/minimize window icons 112, thereby implying that display 102 can only be a window within a particular operating environment, the present embodiments also apply to applications that have views that take over an entire window. Such application views have no maximize/minimize window icons 112. In general, these applications bypass the graphical user interface and write directly to a graphics driver.

FIG. 3A through 3D show different views of an embodiment of a pointing device 100-3, which is moved along an operating surface 140 to control the position of the cursor or pointer 106 on the graphical display 102 as previously described. In the embodiment shown, the device has a body 142 which includes an upper portion 144 and an underside 146 (shown in FIG. 3C). A user grips upper portion 144 to move the pointing device 100-3 along the operating surface 140. Multiple skates, which are attached to the underside 146 of body 142, are in direct contact with operating surface 140. The skates are described in detail further below. In the embodiment shown, movement of pointing device 100-3 is detected by the tracking assembly 104 described earlier and processed by the graphical user interface component 108 to position the cursor or pointer 106 in response to the detected movement. Although in the illustrated embodiment, the pointing device 100-3 is moved to control the position of the cursor or pointer 106, application of the illustrated embodiments described herein is not necessarily limited to movement of the pointing device for controlling the position of the cursor or pointer 106.

As will be more apparent form the following description, pointing device 100-3 includes several features that contribute to the "customization"/tuning of the pointing device for fast-paced and accurate usage. The customization features are intended to allow a user to tune the physical performance as well as on-screen performance (along with software and firmware) of pointing device 100-3 for best results in the user's environment and preferences. Accordingly, the customization features include mechanical customization features as well as software customization features. At least some of the mechanical customization features are configured to releasably mechanically couple to pointing device body 142 and are replaceable. Therefore, pointing device 100-3 it typically shipped as a pointing device kit, which also includes replacement components. Individual customization features of pointing device 100-3 are described below.

Replaceable Skates

As noted above, skates (denoted by reference numeral 148-1 in FIG. 4C) are in direct contact with operating surface 140 and therefore have a direct impact on the effort needed to move pointing device 100-3. In general, pointing devices are used on different types of surfaces including pointing device pads and tables of various materials and textures resulting in different coefficients of friction and therefore impacting a rate of "glide" that a pointing device has. Further, the weight applied to a pointing device is a result of a manner in which a user holds, moves, and applies pressure, to the pointing device. Different users will have different characteristics. Also, as with any control problem, a movable object needs to be light and agile enough to move with minimal effort, but should have enough resistance to stop accurately. This is a typical over/critical/under damp control scenario with the solution being to critically damp.

Figure 4A:
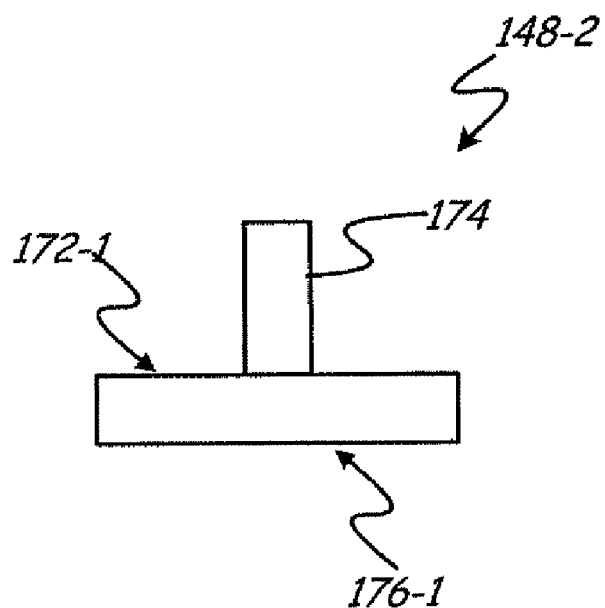
FIGS. 4A and 4B are profile views of replaceable skates that releasably mechanically couple to a pointing device body.
Figure 4B:
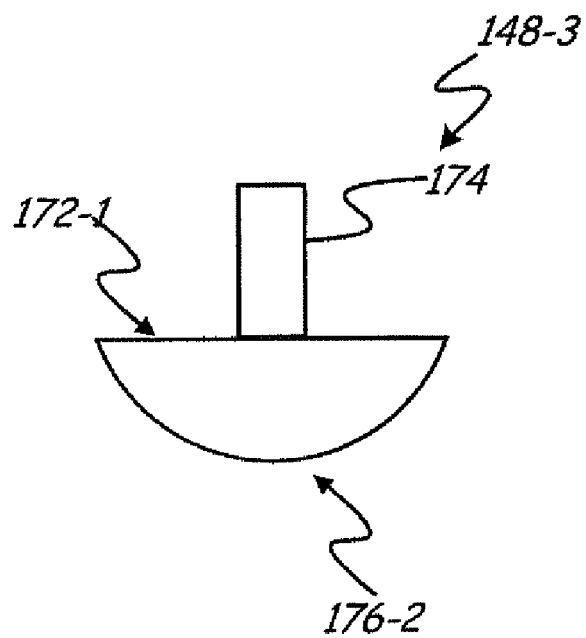

To address the above-mentioned needs, pointing device 100-3, in general, includes at least one replaceable skate that a user can substitute with another skate having a different slickness level. FIGS. 4A and 4B are profile views of example embodiments of skates that can be used in a pointing device such as 100-3. Skate 148-2 (shown in FIG. 4A) includes a base 172-1, a replacement mechanism 174 connected to the base 172-1 and a substantially planar skate surface 176-1. Skate 148-3 of FIG. 4B is similar to skate 148-2, but includes a substantially convex skate surface 176-2.

In the embodiment shown in FIG. 3C, pointing device 100-3 includes five replaceable skates (denoted by reference numeral 148-1). Each of the five replaceable skates 148-1 is configured to releasably mechanically couple to the underside 146 of the pointing device body 142. In a specific embodiment, pointing device 100-3 is shipped with one set of releasably mechanically coupled skates and two additional sets of spare skates that have skate surfaces with different slickness levels. Each set of skates has a different color to indicate that slickness levels are different for each set. In general, any type of coloring or marking scheme can be used to differentiate skate slickness levels. Teflon additives or other suitable materials may be used to produce skates with different slickness levels. In some embodiments, even metal skates can be used. As noted above, different shapes for skate surfaces can also be employed.

As indicated above, each skate includes a replacement mechanism for releasably mechanically coupling to the underside 146 of the pointing device body 142. Examples of suitable replacement mechanisms include a press-fit arrangement, a "rotate-to-lock" mechanism, a screw, and magnetic attachments. Of course, other replacement mechanisms can also be used. A press-fit arrangement for releasably coupling a skate to the underside 146 of a pointing device is described in connection with FIGS. 5A-5C.

Figure 5A:
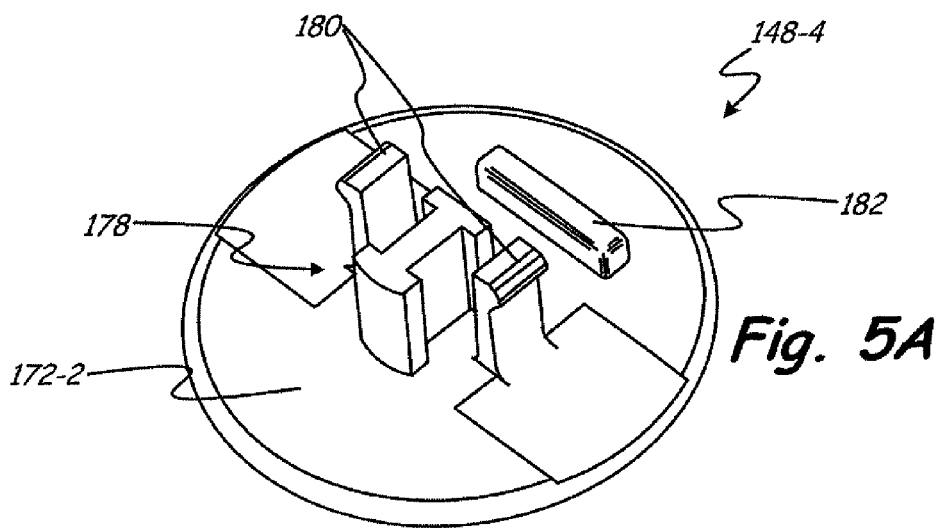
FIGS. 5A-5C are diagrammatic illustrations that show the attachment of a replaceable skate to a pointing device body.
Figure 5B:
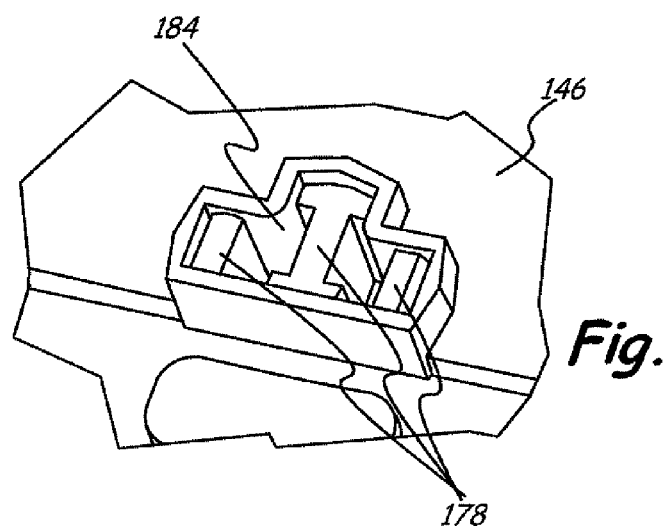
Figure 5C:
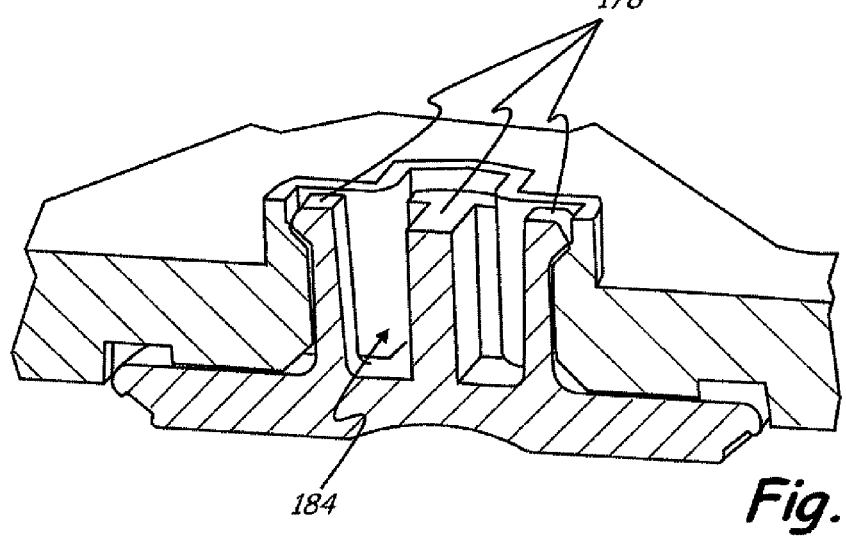

In general, a press-fit arrangement for releasably coupling a skate (148-1, 148-2, 148-3, 148-4) to the underside of a pointing device includes at least one protruding feature that extends from a base of the skate, and a groove, in the underside of the pointing device body, configured to engagingly receive the at least one protruding feature. In the specific embodiment shown in FIGS. 5A-5C, multiple protruding features 178, some of which include hooks 180, are coupled to base 172-2 skate 148-4. The press-fit arrangement also includes a groove 184 (in the underside 146 of the pointing device body) which is shaped such that it engagingly receives at least some of the protruding features 178. As can be seen in FIG. 5A, the protruding features 178 also include a keyed feature 182, which is included to ensure that the remaining protruding features can be fit into groove 184 only in one direction and also to limit movement of skate 148-4 once it is fit into the groove 184. FIGS. 5B and 5C illustrate how protruding features 178 fit into the groove 184.

Figure 5D:
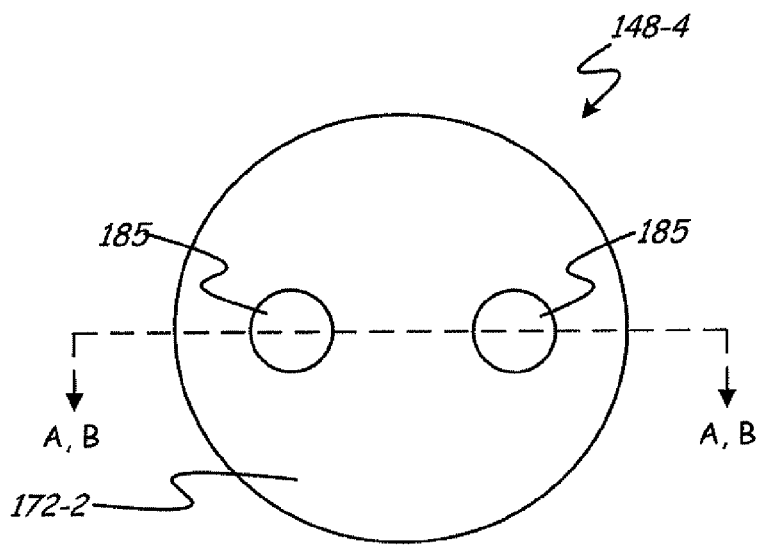
FIGS. 5D-5F are diagrammatic illustrations that show wear indicators included in a skate.
Figure 5E:
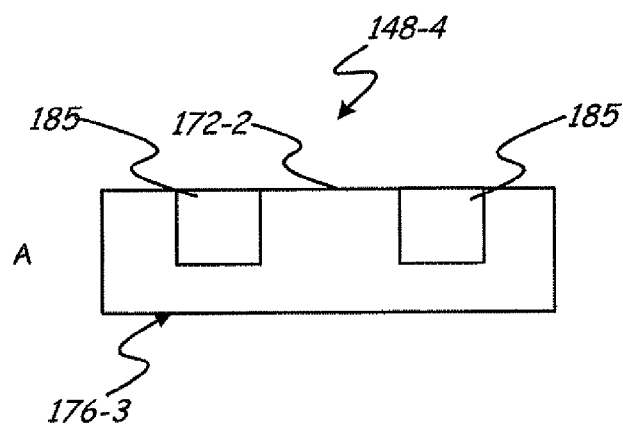
Figure 5F:
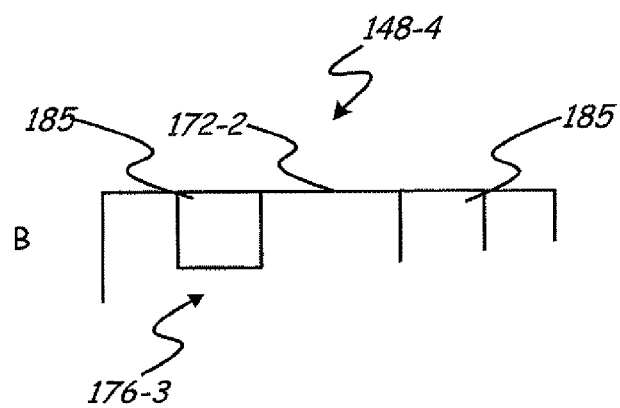

In addition to the above-described features that a skate can include, in one embodiment, a skate can include at least one wear indicator to indicate to a user that the skate has worn to a point of needing replacement. FIGS. 5D through 5F illustrate a skate with wear indicators. In the interest of simplification, a replacement mechanism 174 (such as protruding features 178) is not shown in FIGS. 5D through 5F.

FIG. 5D is a top view (view form above a base) of a skate such as 148-4 that includes wear indicators 185. FIG. 5E is a cross-sectional view of un-worn skate 148-4, and FIG. 5F is a cross-sectional view of worn skate 148-4. As shown in FIGS. 5D through 5F, wear indicators 185 can be built into an existing skate design. In one embodiment, material is cored out of the base 172-2 of skate 148-4, so that when the skate surface 176-3 which contacts the operating surface (such as 140 of FIG. 3A) is worn down, a hole (or groove) or some other warning mechanism (for example, a colored material) will show through from the skate surface 176-3, giving a substantially accurate assessment of skate wear. This cored out area could be a word such as "replace," or could be a "gritty" material that tactilely indicates to the user that the skates are worn. In general, any suitable type of wear indicator can be used.

Weights

As noted above, for certain computer applications, such as fast paced computer games, rapid movement and positioning of a pointing device is needed to substantially constantly target moving objects and views in a game environment. As mentioned above, another factor in achieving a critically damped response from a moving object is the weight applied, which contributes to how the object moves and stops (the inertia). Different users apply varying pressure to the pointing device and may require a lighter or heavier pointing device, to compensate for their style of use, in order to achieve a critically damped response. Thus, pointing device 100-3 also allows for the addition of weights in suitable increments to tune the device weight.

Figure 3D:
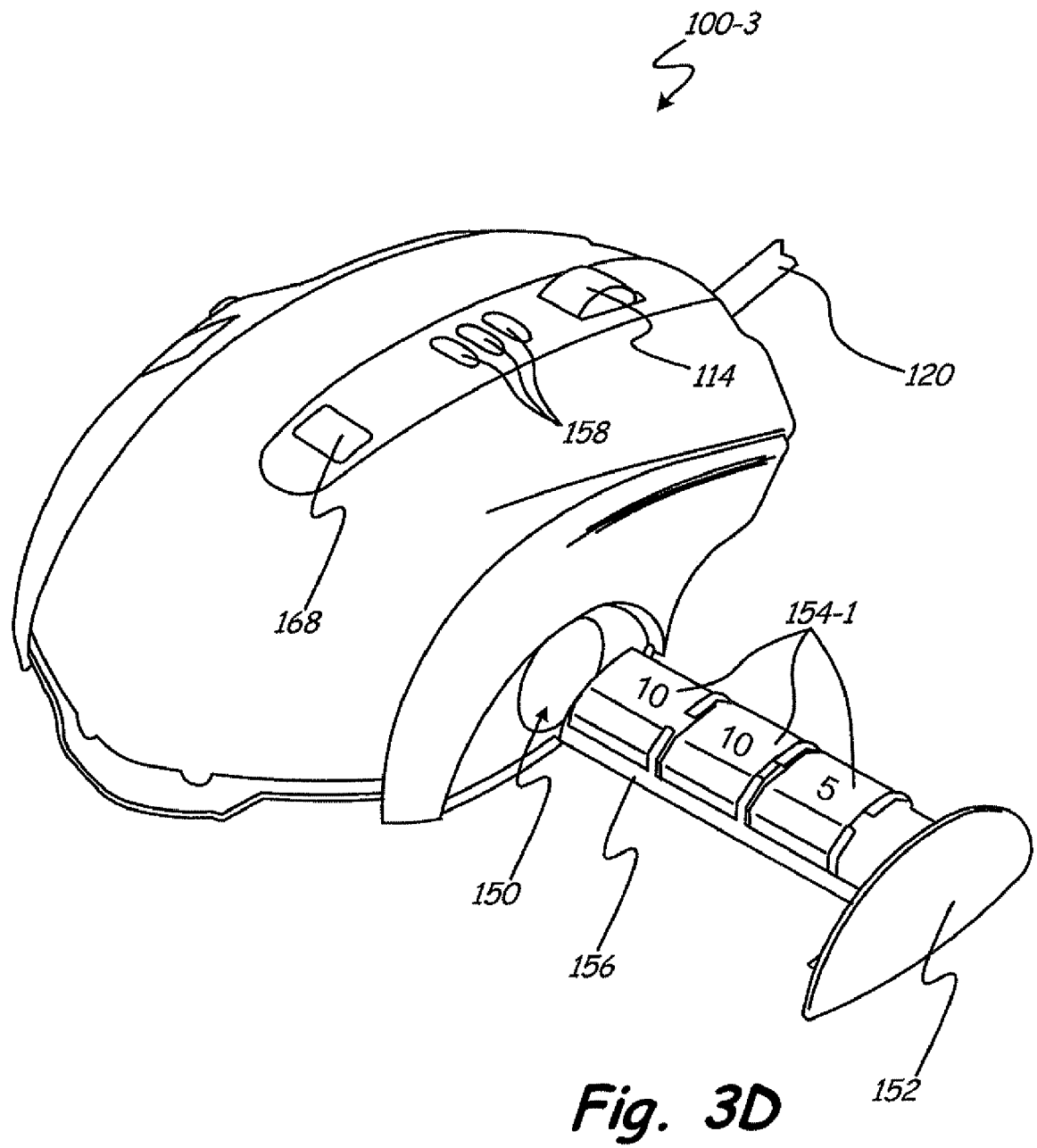

In general, as can be seen in FIG. 3D, upper portion 144 of pointing device 100-3 includes an accommodating space 150, accessible via a door 152, for the addition of weights. More specifically, upper portion 144 of pointing device body 142 includes a weight tray 156 that is attached to the door 152. The weight tray 156 fits within the accommodating space 150. One or more of weights 154-1 (which are examples of mechanical customization features) can be releasably mechanically coupled to the weight tray 156. In a specific embodiment, the pointing device 100-3 allows for addition of weights in 5 and 10 gram (g) increments to tune the device weight. In a particular embodiment, pointing device 100-3 is shipped with three 10 g weights and one 5 g weight. As can be seen in FIG. 3D, the pointing device 100-3 can carry up to three weights. This creates additional weight combinations of: 0 g, 5 g, 10 g, 15 g, 20 g, 25 g and 30 g.

Additionally, pointing device 100-3 is designed to be relatively "weight balanced" without any additional weights. This is useful in a motion when the device reaches one end of a pointing device pad and the user picks up the device and moves it back to another end to continue the motion. This motion, which is also known as "clutching," can be thought of as a pointing device "takeoff," "flight," and "landing." As a pointing device that employs optical/laser tracking is taking off or landing on a surface, tracking is still taking place up to a certain distance. Any takeoff/landing that is not vertical can cause a slight drift in X/Y directions of the cursor on a screen. A weight balanced pointing device (with respect to grip points a user applies) helps to ensure that a pointing device has optimum vertical takeoff/landing and least amount of cursor movement on-screen during this action.

Dots Per Inch (DPI) Buttons

Another aspect of on-screen control is how sensitive the cursor is to the physical movement of the pointing device. In certain situations (such as looking around in a game, or use with higher resolution displays) it may be desirable to have a small physical movement of the pointing device result in a large cursor movement on-screen. In other situations (such as targeting a small object on-screen) it may be desirable to correlate a large physical movement of a pointing device with a small cursor movement. There may also be situations in between depending on preferences and display resolutions.

In general, pointing device 100-3 addresses the above needs by allowing for "on-the-fly" changing of the DPI resolution. More specifically, pointing device 100-3 allows users to have multiple DPI values at their fingertips to choose from and also allows for the designation of DPI values, obtainable via software, to be available at the users fingertips. In a particular embodiment shown in FIG. 3B, pointing device 100-3 utilizes three switches 148 placed in a bar format with (high/mid/low positions) for three user-assignable DPI values. Assigned DPI values for each of switches 148 are stored in memory registers within firmware 162. Assignment of a particular DPI value to a particular DPI switch 128 can take place by selection a particular DPI value from a set of DPI values available in software on computer/electronic device 103.

In essence, the above embodiment allows for high/mid/low DPI value assignment and an intuitive manner of getting to the desired DPI value with only one click. Also, with the help of LEDs 160, a designated DPI switch lights up showing which switch is selected coupled with an LCD/active display, via display component 164, showing the actual DPI number in DPI units.

Macro Record Button

In many games and even desktop applications, it is very desirable to have a sequence of button actions recorded as a macro to be played back. In a game, this can be reload-jump-shoot, for example. Pointing device 100-3 allows for in-game recording by utilizing a macro recording and assignment feature that includes recording button 166 and software that can be included on computer/electronic device 103. In a particular embodiment, the macro recording sequence is pressing button 166 to start recording, assigning a button (any one of top buttons 110-1 and side buttons 110-2, for example) to record to, applying the action in-game (in general, in-application), and stopping the recording. Subsequent pressing of the assigned button recreates the in-game action recorded.

This recorded macro can also be edited outside of a game (or, in general, an application), using suitable software on computer/electronic device 103, for fine tuning adjustments such as timing between assigned actions.

Shortcut Button

With certain electronic devices 103 (such as gaming devices) a shortcut to certain features such as launching a particular application may be desirable. Thus, pointing device 100-3 includes a shortcut button 168, which can be reserved for a launching a particular application, for example.

Cable Anchor/Accessory Box

Figure 6A:
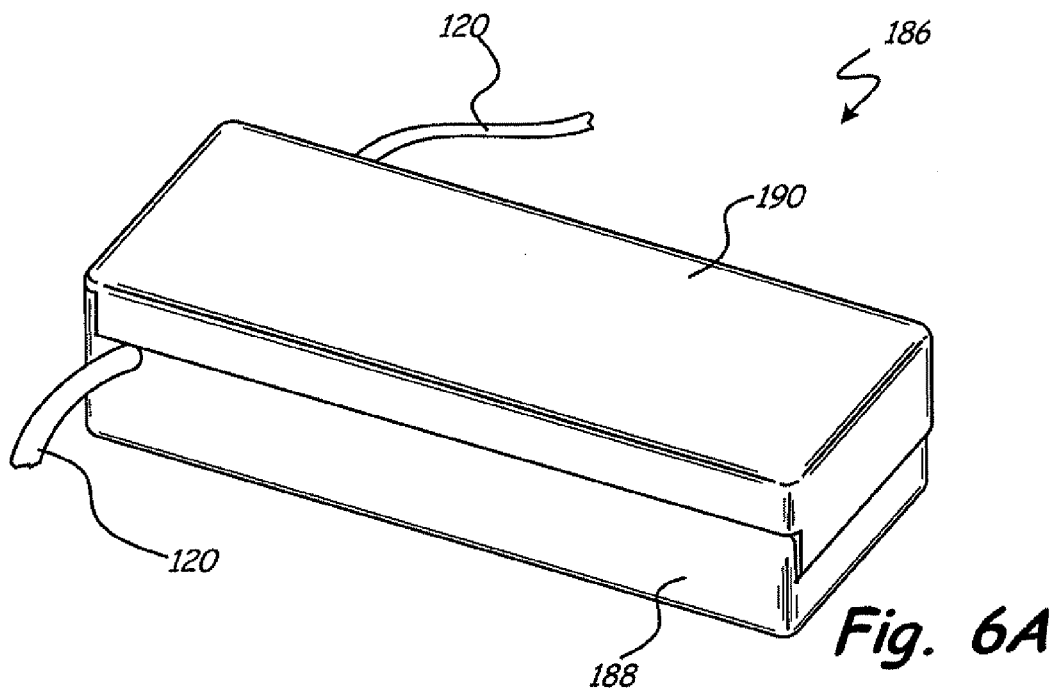
FIGS. 6A and 6B are diagrammatic illustrations of a cable anchor which doubles as an accessory box.
Figure 6B:
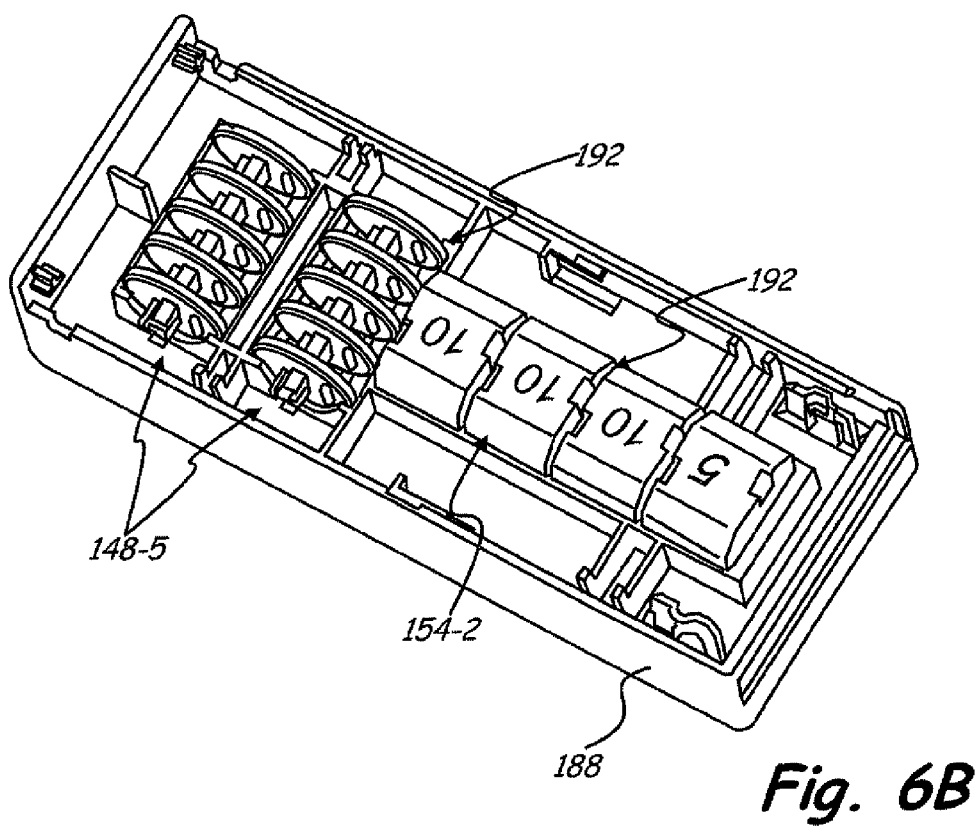

As indicated earlier, to be able to move and stop a pointing device at will, any unintended resistance is a negative. In a wired device such as 100-3, tension caused by cable 120 and the potential for other objects being dragged by cable 120 is a negative. To limit a moving part of the cable 120 to a selected length, pointing device 100-3 a cable anchor 186. In addition to being able to hold cable 120 in place in a manner shown in FIG. 6A, cable anchor 186, which includes a container 188 a top cover 190 for container 188, doubles as an accessory box to house any extra skates and extra weights that may be shipped with pointing device 100-3. Specifically, container 188 includes storage compartments 192 that are configured to receive the extra skates and extra weights. Of course, a wireless embodiment of pointing device 100-3 need a cable anchoring feature, but would only need a container for the extra skates and weights.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A pointing device comprising:
   a pointing device body, having an upper portion and an underside, the upper portion including an accommodating space accessible via a door in the upper portion; and
   a weight tray that is attached to the door such that the door and the weight tray are together removable such that the weight tray slides out from the pointing device body when the door is removed from the pointing device body, the weight tray being configured to fit within the accommodating space;
   a tracking assembly including at least one sensor to detect movement and output a control signal responsive to the detected movement; and
   a plurality of customization features including mechanical customization features and software customization features,
   wherein at least one of the mechanical customization features is configured to releasably mechanically couple to the pointing device body.

2. The pointing device of claim 1, wherein at least one of the mechanical customization features comprises at least one replaceable skate, having a base and a skate surface, that is configured to releasably mechanically couple to the underside of the pointing device body such that at least a portion of the base extends through the underside of the pointing device body.

3. The pointing device of claim 2 wherein the hook-and-groove arrangement comprises:
   at least one protruding movable hook that extends from the base of the at least one skate; and
   a groove, in the underside of the pointing device body, configured to engagingly receive the at least one protruding movable hook.

4. The pointing device of claim 1, wherein the at least one skate is configured to releasably mechanically couple to the underside of the pointing device body with a hook-and-groove arrangement.

5. The pointing device of claim 1, wherein the underside is a transducer surface that engages an operating surface when the pointing device is in use.

6. The pointing device of claim 1, further comprising a macro recording and assignment feature.

7. The pointing device of claim 1, further comprising multiple programmable dots per inch (DPI) switches, which are each programmable for a specific DPI value.

8. The pointing device of claim 1, wherein at least a portion of the sensor is exposed by an opening formed in the underside, and wherein the sensor is not exposed through any opening formed in the upper portion.

9. The pointing device of claim 1 further comprising a shortcut button.

10. the pointing device of claim 1, wherein the weight tray is further configured to slide out of the accommodating space in a direction that is in a plane generally parallel to the underside.

* * * * *